US012615270B1

(12) United States Patent
Rotem et al.

(10) Patent No.: US 12,615,270 B1
(45) Date of Patent: Apr. 28, 2026

(54) WORKSPACE CYBER PROTECTION PLATFORM AND METHODS THEREOF

(71) Applicant: Cyvore Security, LTD, Tel Aviv (IL)

(72) Inventors: Yoav Rotem, Jerusalem (IL); Ori Segal, Giv'atayim (IL); Yiftach Rotem, Jerusalem (IL)

(73) Assignee: Cyvore Security, LTD, Tel Aviv (IL)

( * ) Notice: Subject to any disclaimer, the term of this patent is extended or adjusted under 35 U.S.C. 154(b) by 0 days.

(21) Appl. No.: 19/349,558

(22) Filed: Oct. 3, 2025

(51) Int. Cl.
*H04L 29/06* (2006.01)
*H04L 9/40* (2022.01)

(52) U.S. Cl.
CPC ...... *H04L 63/1416* (2013.01); *H04L 63/1441* (2013.01)

(58) Field of Classification Search
CPC .................. H04L 63/1416; H04L 63/1441
See application file for complete search history.

(56) References Cited

U.S. PATENT DOCUMENTS

| | | | |
|---|---|---|---|
| 7,974,286 B2 | 7/2011 | Keohane et al. | |
| 9,432,318 B2 | 8/2016 | Howard et al. | |
| 10,419,378 B2 | 9/2019 | Eikenberry et al. | |
| 10,601,853 B2 * | 3/2020 | Chesla ................ | H04L 63/1433 |
| 10,771,418 B2 | 9/2020 | Sachtjen et al. | |
| 11,032,298 B1 * | 6/2021 | Robbins .............. | H04L 63/1416 |
| 11,205,233 B1 * | 12/2021 | Callahan ................ | G06Q 40/12 |
| 11,416,609 B1 * | 8/2022 | Hencinski ............. | G06F 21/554 |
| 2005/0015624 A1 * | 1/2005 | Ginter ................... | H04L 63/145 |
| | | | 726/4 |
| 2006/0174342 A1 * | 8/2006 | Zaheer ................ | H04L 63/1416 |
| | | | 726/23 |
| 2018/0288077 A1 * | 10/2018 | Siddiqui ............. | H04L 63/1416 |
| 2019/0124108 A1 * | 4/2019 | Doyle ...................... | H04L 63/20 |
| 2023/0031994 A1 * | 2/2023 | Jarvis ................. | G06Q 10/0635 |
| 2023/0113621 A1 * | 4/2023 | Griffin .................. | G06F 21/567 |
| | | | 726/23 |
| 2023/0247046 A1 * | 8/2023 | Peters ..................... | G06F 9/547 |
| | | | 726/23 |
| 2024/0414191 A1 * | 12/2024 | Humphrey .......... | H04L 63/1441 |
| 2025/0047698 A1 * | 2/2025 | Rund .................. | H04L 63/1425 |

* cited by examiner

*Primary Examiner* — Shawnchoy Rahman
(74) *Attorney, Agent, or Firm* — M&B IP Analysts, LLC

(57) ABSTRACT

A system and method for detecting a cybersecurity attack in a workspace platform is presented. The method includes ingesting workspace data from a cloud-based workspace provider; selecting a first-tier investigation script from a plurality of investigation scripts, the plurality of investigation scripts including the first-tier investigation script and a second-tier investigation script; executing the first-tier investigation script on the ingested workspace data; detecting a potential cybersecurity attack based on a result of executing the first-tier investigation script; and executing the second-tier investigation script in response to detecting the potential cybersecurity attack.

19 Claims, 10 Drawing Sheets

START

S310

INGEST WORKSPACE DATA FROM A PLURALITY OF SOURCES

S320

SELECT INVESTIGATION SCRIPT FROM A PLURALITY OF INVESTIGATION SCRIPTS

S330

INITIATE INVESTIGATION SCRIPT

S340

OPTIONALLY ITERATE INVESTIGATION SCRIPTS

S350

REMEDIATE CYBERSECURITY DETECTION BASED ON RESULT OF EXECUTING THE INVESTIGATION SCRIPT

END

START

S410

INGEST WORKSPACE DATA FROM A PLURALITY OF SOURCES

S420

INITIATE OPTICAL INVESTIGATION SCRIPT

S430

INITIATE LANGUAGE MODEL BASED THREAT ASSESSMENT

S440

INITIATE ACTIVE THREAT INTELLIGENCE INVESTIGATION

S450

GENERATE AN INVESTIGATION DETECTION

END

START

S510

INGEST WORKSPACE DATA FROM A PLURALITY OF SOURCES

S520

ADAPT A LANGUAGE MODEL TO PROCESS AN INPUT BASED ON A MULTI-TENANT SCHEMA AND THE INGESTED WORKSPACE DATA

S530

CONFIGURE A GENERATIVE AI SYSTEM TO UTILIZE THE ADAPTED MODEL TO PROCESS AN INPUT BASED ON A RESULT OF AN INVESTIGATION OF A WORKSPACE INPUT

END

600

```
{
  "plugin_id": "uuid4",
  "indicator_id": "ind-uuid4",
  "verdict": "suspicious",
  "confidence": 0.82,
  "next_plugins": ["ocr_plugin"],
  "new_indicators": [
    { "type": "img/screenshot", "value": "https://vault/xyz" }
  ]
}
```

```
{
    "investigation_id": "inv-123",
    "tenant_id": "tenant-a",
    "media_type": "email",
    "indicators": [ ... ],
    "source": "email-ingestor"
}
```

```
weights:
    base_priority: 0.3
    runtime: 0.4
    confidence: 0.2
    chained: 0.1
```

WORKSPACE CYBER PROTECTION PLATFORM AND METHODS THEREOF

TECHNICAL FIELD

The present disclosure relates generally to workspace security, and specifically to detection of cybersecurity attacks originating in workspaces connected to cloud computing environments.

BACKGROUND

Enterprises increasingly rely on workspace platforms such as Slack®, Zoom®, Microsoft® Teams, and emerging messaging channels. Adversaries exploit these platforms with phishing links, brand impersonation, and weaponized files delivered in conversational context.

Existing defenses are often email-centric and depend on static reputation lists, providing limited cross-platform correlation and insufficient use of in-band artifacts and meta-data. Response latency and fragmented telemetry hinder timely triage. Many environments are multi-tenant and subject to strict compliance expectations, yet prior approaches may not provide strong tenant isolation, auditable processing, or configurable retention.

Operational realities, including heterogeneous cloud and on-prem deployments, cost control, and the need to onboard new analytic capabilities without re-architecture, further complicate adoption. As organizations add channels such as WhatsApp®, Signal®, Telegram®, and the like, security visibility and SOC workflows become increasingly complicated, exacerbating false negatives and operational burden.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include ingesting workspace data from a cloud-based workspace provider. The method may also include selecting a first-tier investigation script from a plurality of investigation scripts, the plurality of investigation scripts including the first-tier investigation script and a second-tier investigation script. The method may furthermore include executing the first-tier investigation script on the ingested workspace data. The method may in addition include detecting a potential cybersecurity attack based on a result of executing the first-tier investigation script. The method may moreover include executing the second-tier investigation script in response to detecting the potential cybersecurity attack. Other embodiments of this aspect include corresponding computer systems, apparatus, and computer programs recorded on one or more computer storage devices, each configured to perform the actions of the methods.

Implementations may include one or more of the following features. The method may include: determining that the potential cybersecurity attack is an actual cybersecurity attack based on a result of executing the second-tier investigation script; and initiating a remediation action based on the actual cybersecurity attack. The method may include: ingesting multi-tenant workspace data from the cloud-based workspace provider; and executing the first-tier investigation script only on ingested data of a first tenant. The method may include: executing a plurality of first-tier investigation scripts prior to executing the second-tier investigation script, where each first-tier investigation script utilizes less compute resources than the second-tier investigation script. The method may include: detecting the potential cybersecurity attack further based on an indicator of compromise (IOC) database, where the IOC database is generated based on multi-tenant data. The method may include: generating a detection based on any one of: the result of executing the first-tier investigation script, a result of executing the second-tier investigation script, and any combination thereof. The method may include: generating the detection further based on an entry in the IOC database. The method may include: initiating a remediation action in a cloud computing environment utilizing the cloud-based workspace provider, the remediation action based on the entry in the IOC database. The method may include: executing any one of a plurality of investigation scripts, including: an optical recognition script, a data analysis script, a mitigation script, and any combination thereof. Implementations of the described techniques may include hardware, a method or process, or a computer tangible medium.

In one general aspect, a non-transitory computer-readable medium storing a set may include one or more instructions that, when executed by one or more processing circuitry of a device, cause the device to: ingest workspace data from a cloud-based workspace provider; select a first-tier investigation script from a plurality of investigation scripts, the plurality of investigation scripts including the first-tier investigation script and a second-tier investigation script; execute the first-tier investigation script on the ingested workspace data; detect a potential cybersecurity attack based on a result of executing the first-tier investigation script; and execute the second-tier investigation script in response to detecting the potential cybersecurity attack. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: ingest workspace data from a cloud-based workspace provider. The system may in addition select a first-tier investigation script from a plurality of investigation scripts, the plurality of investigation scripts including the first-tier investigation script and a second-tier investigation script. The system may moreover execute the first-tier investigation script on the ingested workspace data. The system may also detect a potential cybersecurity attack based on a result of executing the first-tier investigation script. The system may furthermore execute the second-tier investigation script in response to detecting the potential cybersecurity attack. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: determine that the potential cybersecurity attack is an actual cybersecurity attack based on a result of executing the second-tier investigation script; and initiate a remediation action based on the actual cybersecurity attack. The system where the memory contains further instructions which when executed by the processing circuitry further configure the system to: ingest multi-tenant workspace data from the cloud-based workspace provider; and execute the first-tier investigation script only on ingested data of a first tenant. The system where the memory contains further instructions which when executed by the processing circuitry further configure the system to: execute a plurality of first-tier investigation scripts prior to executing the second-tier investigation script, where each first-tier investigation script utilizes less compute resources than the second-tier investigation script. The system where the memory contains further instructions which when executed by the processing circuitry further configure the system to: detect the potential cybersecurity attack further based on an indicator of compromise (IOC) database, where the IOC database is generated based on multi-tenant data. The system where the memory contains further instructions which when executed by the processing circuitry further configure the system to: generate a detection based on any one of: the result of execute the first-tier investigation script, a result of executing the second-tier investigation script, and any combination thereof. The system where the memory contains further instructions which when executed by the processing circuitry further configure the system to: generate the detection further based on an entry in the IOC database. The system where the memory contains further instructions which when executed by the processing circuitry further configure the system to: initiate a remediation action in a cloud computing environment utilizing the cloud-based workspace provider, the remediation action based on the entry in the IOC database. The system where the memory contains further instructions which when executed by the processing circuitry further configure the system to: execute any one of a plurality of investigation scripts, including: an optical recognition script, a data analysis script, a mitigation script, and any combination thereof. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 6 is an example investigation output of a cybersecurity module script, utilized to describe an embodiment.

FIG. 8 is an example code object indicating a weight function for a cybersecurity module of a plurality of cybersecurity modules, utilized to describe an embodiment.

DETAILED DESCRIPTION

Figure 1:
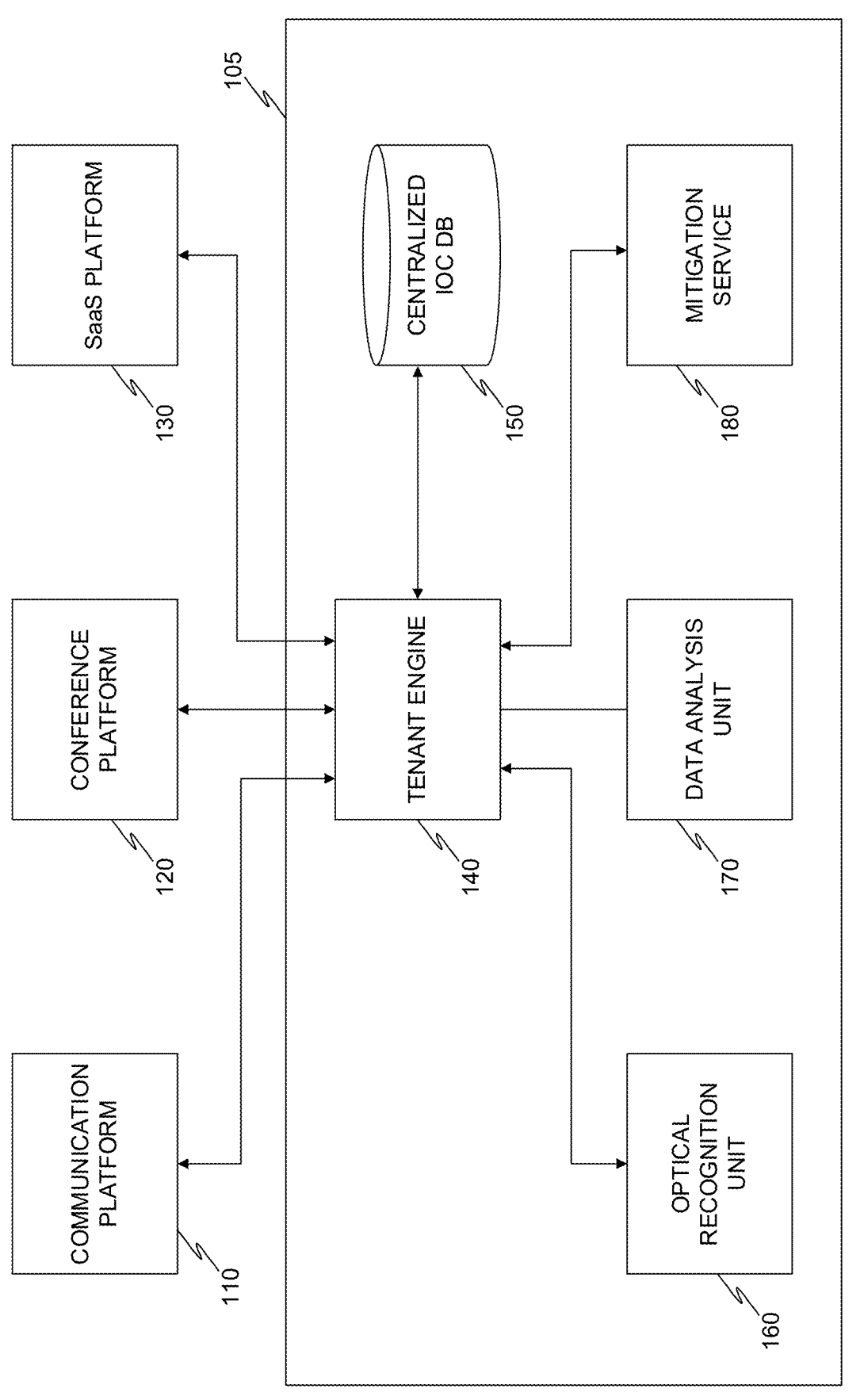
FIG. 1 is an example schematic diagram of a multi-tenant workspace protection system, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example schematic diagram of a multi-tenant workspace protection system, implemented in accordance with an embodiment. In an embodiment, the multi-tenant workspace protection system 105 (referred to for simplicity as system 105), is configured to provide detection of cybersecurity threats originating in a workspace.

In an embodiment, a workspace includes an organization's collaboration surface, including software services such as chat, video, email, and file-sharing systems utilized by users, service accounts, and the like. Examples include Slack®, Zoom®, Microsoft® Teams, Google® Meet, email services, and the like.

According to an embodiment, workspace data includes messages, text threads, channels, meetings, recordings, attachments, files, URLs, associated metadata, various combinations thereof, and the like. Metadata may be, for example, tenant IDs, timestamps, user ID, context, a combination thereof, and the like.

In certain embodiment, a workspace is implemented as a software-based platform, such as communication platform 110, conference platform 120, SaaS platform 130, and the like. For example, a communication platform 110 may be Slack, a conference platform 120 may be Zoom, and a SaaS platform 130 may be Salesforce®. In an embodiment, these platforms are configured to expose events and artifacts through APIs, webhooks, and the like, that can be ingested and processed within a tenant boundary.

For example, an event indicates a message, a message thread, an email, a video call, a conference call, generation of a ticket, generation of a request, various combinations thereof, and the like.

In an embodiment, a system 105 is configured to receive events from a plurality of software-based platforms. In some embodiments, the system includes a tenant engine 140 which is configured to detect events related to a specific tenant, for example based on identifiers (IDs) associated with the specific tenant.

In certain embodiments, the system 105 includes a plurality of tenant engines, each tenant engine configured to process data from a platform corresponding to a unique tenant identifier. An example tenant engine 140 is discussed in more detail in FIG. 2 below. In some embodiments, the tenant engine 140 is configured to receive data from the communication platform 110, the conference platform 120, the SaaS platform 130, a combination thereof, and the like. In an embodiment, the tenant engine 140 is configured to initiate cybersecurity investigations based on the received data.

In some embodiments, the system 105 includes a centralized indicator of compromise (IOC) database 150. In an embodiment, the IOC database 150 is implemented as a structured store of Indicators of Compromise (IOC). An IOC may be, for example, a URL, an IP address, a domain, an email address, a file hash, metadata (e.g., tenant identifier, timestamps, plugin identifier, verdict, a score), a relationship, a TTL (time to live), various combinations thereof, and the like.

In an embodiment, the IOC database 150 is configured to enable fast deduplicated lookups for scans, support action chaining (e.g., click URL, screenshot), and provide enrichment from central threat intelligence. According to an embodiment, IOCs are first-class entities ("indicators") persisted in an investigation database and referenced across investigations, checks, and actions, to drive real-time decisions and auditing.

According to an embodiment, the IOC database 150 is a multi-tenant database, providing IOC database entries to each tenant. In some embodiments, a tenant can opt out of updating the IOC database 150 with entries. In certain embodiments, a tenant can opt in to updating the IOC database 150 with entries, such that data ingested from workspaces of the tenant is utilized to generate entries when an indicator of compromise is detected in a workspace of the tenant.

In an embodiment, the tenant engine 140 is configured to initiate a cybersecurity investigation. According to an embodiment, the tenant engine 140 is configured to execute an investigation script of a plurality of investigation scripts. In an embodiment, an investigation script includes a stateless analyzer that operates on a single indicator (e.g., URL, IP, file, domain, email). In some embodiments, the tenant engine 140 is configured to select candidate investigation scripts per indicator type and prioritize them via a dynamic scoring model (runtime, cache TTL, effectiveness, chaining impact, etc.).

In some embodiments, the tenant engine 140 is configured to group investigation scripts to execute simultaneously, deduplicate investigation scripts, a combination thereof, and the like. In an embodiment, an investigation script executes in-tenant, with per-script processor, memory, timeout, egress allowlist, signed-URL access to artifacts, various combinations thereof, and the like.

In an embodiment, executing an investigation script results in an output (or result). In some embodiments, an output is a verdict, an extracted attribute, and the like. In certain embodiments, an output is published, stored in a database, utilized to generate a user interface, etc.

According to an embodiment, an investigation script is configured to initiate actions such as "click URL", "take screenshot", etc., which spawn new indicators and checks up to a bounded generation depth, i.e., a number of investigation scripts which are executed serially based on a result of a previously executed script. In some embodiments, the generation depth is '3', such that a first script is executed to generate a first result, a second script is executed based on the first result to generate a second result, and a third script is executed based on the second result to generate a third result. In an embodiment, an output is generated based on a combination of the first result, second result, third result, a combination thereof, and the like.

In some embodiments, a Redis® cache with per-tenant TTLs prevents redundant executions and influences scheduling. In an embodiment, tenants have distinct investigation script catalogs and configuration.

In an embodiment, the system 105 includes an optical recognition unit 160 (ORU 160). According to an embodiment, the ORU 160 is configured to initiate an investigation script from the plurality of investigation scripts. In an embodiment, the ORU 160 is configured to analyze visual artifacts from suspected content to extract signals for investigation.

For example, in an embodiment the ORU 160 is configured to access targets (e.g., by accessing a URL over a network interface), capture a screenshot, and initiate an investigation script which includes a visual-analysis that performs OCR to pull on-page text, detect logos, detect brand marks, etc., and flag UI patterns typical of login pages.

In an embodiment, a result of such execution is scored and combined with other results from other investigation scripts. In an embodiment, a high-confidence score triggers deeper actions (e.g., follow links, fetch HTML, etc.) or support fast, early verdicts.

In certain embodiments, the system 105 includes a data analysis unit 170 (DAU 170). In an embodiment, DAU 170 is configured to receive normalized workspace events and analyze them using investigation scripts. In an embodiment, the DAU 170 is configured to select and prioritize investigation scripts per indicator via a dynamic scoring model (including, e.g., runtime cost, cache TTL, expected effectiveness, chaining impact, etc.).

According to an embodiments, the system 105 further includes a mitigation service 180. In an embodiment, the mitigation service 180 is configured to expose results and of investigations, for example through an API. For example, when an investigation script completes execution, when an early verdict is available, etc., the mitigation service 180 is configured to compile an investigation status, a verdict update, reference artifact etc., and push results to a tenant-configured webhook, a SIEM, a dashboard, and the like. In an embodiment, the mitigation service 180 is configured to only exposes tenant-scoped data. In some embodiments, signed URLs for time-bounded access to evidence, artifacts, etc., are provided to each tenant.

In some embodiments, the mitigation service 180 is configured to generate mitigation action based on a result of executing an investigation script. For example, a mitigation includes generating an alert, generating a ticket in an issue tracking system, generating a user interface, updating a user interface, various combinations thereof, and the like.

Figure 2:
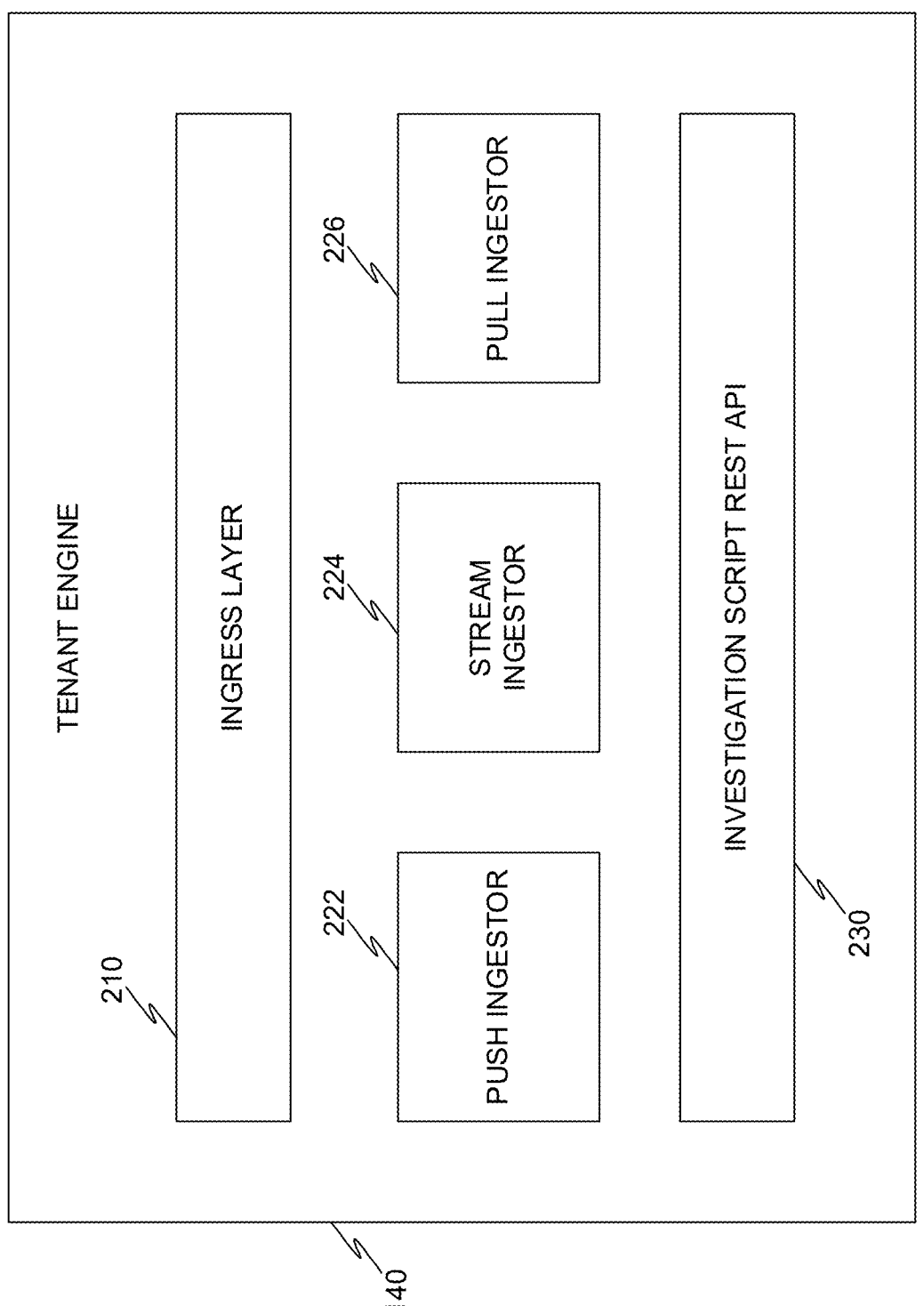
FIG. 2 is an example schematic diagram of a tenant-specific engine of a multi-tenant workspace protection system, implemented in accordance with an embodiment.

FIG. 2 is an example schematic diagram of a tenant-specific engine of a multi-tenant workspace protection system, implemented in accordance with an embodiment. According to an embodiment, a tenant engine 140 is configured to manage a data ingestion process for a single tenant. In an embodiment, the tenant engine 140 is configured to manage data from a single source (i.e., a single workspace), a plurality of sources (e.g., a plurality of workspaces), different sources, same sources, combinations thereof, and the like.

In an embodiment, the tenant engine 140 includes an ingress layer 210. In an embodiment, the ingress layer 210 includes a load balancer, a proxy server, a web server, a firewall, various combinations thereof, and the like. In an embodiment, the tenant engine 140 utilizes a shared ingress layer 210. In some embodiments, certain components of the ingress layer 210 are shared (i.e., multi-tenant) while other components of the ingress layer 210 are single-tenant.

In some embodiments, the tenant engine 140 includes a push ingestor 222, a stream ingestor 224, a pull ingestor 226, various combinations thereof, and the like. In an embodiment, a push ingestor 222 is configured to accept HTTPS webhooks from sources such as Slack, Zoom, email servers, Teams, etc., into Gin/Go receivers. In some embodiments, a stream ingestor 224 is configured to maintain long-lived subscriptions (e.g., chat/call streams), and is further configured to perform the same normalization and publish a flow to an event router, event bus (e.g., NATS, Kafka, etc.), and the like. In an embodiment, a pull ingestor 226 is configured to periodically fetch from sources lacking webhooks, then normalize and emit identical triggers. All three paths converge in the tenant engine, which is configured to select and dispatch investigation scripts via the investigation script API 230. In some embodiments, provisional investigation records may be created for durability. Cross-cutting controls include per-tenant container (e.g., Kubernetes) isolation, egress allowlists, retries/backoff via an event management platform (e.g., JetStream), and unified observability (e.g., through Prometheus, Grafana, Loki, Tempo, Falco, etc.).

In some embodiments, the push ingestor 222 is configured to normalize payloads to an investigation schema utilizing an investigation script API 230

Figure 3:
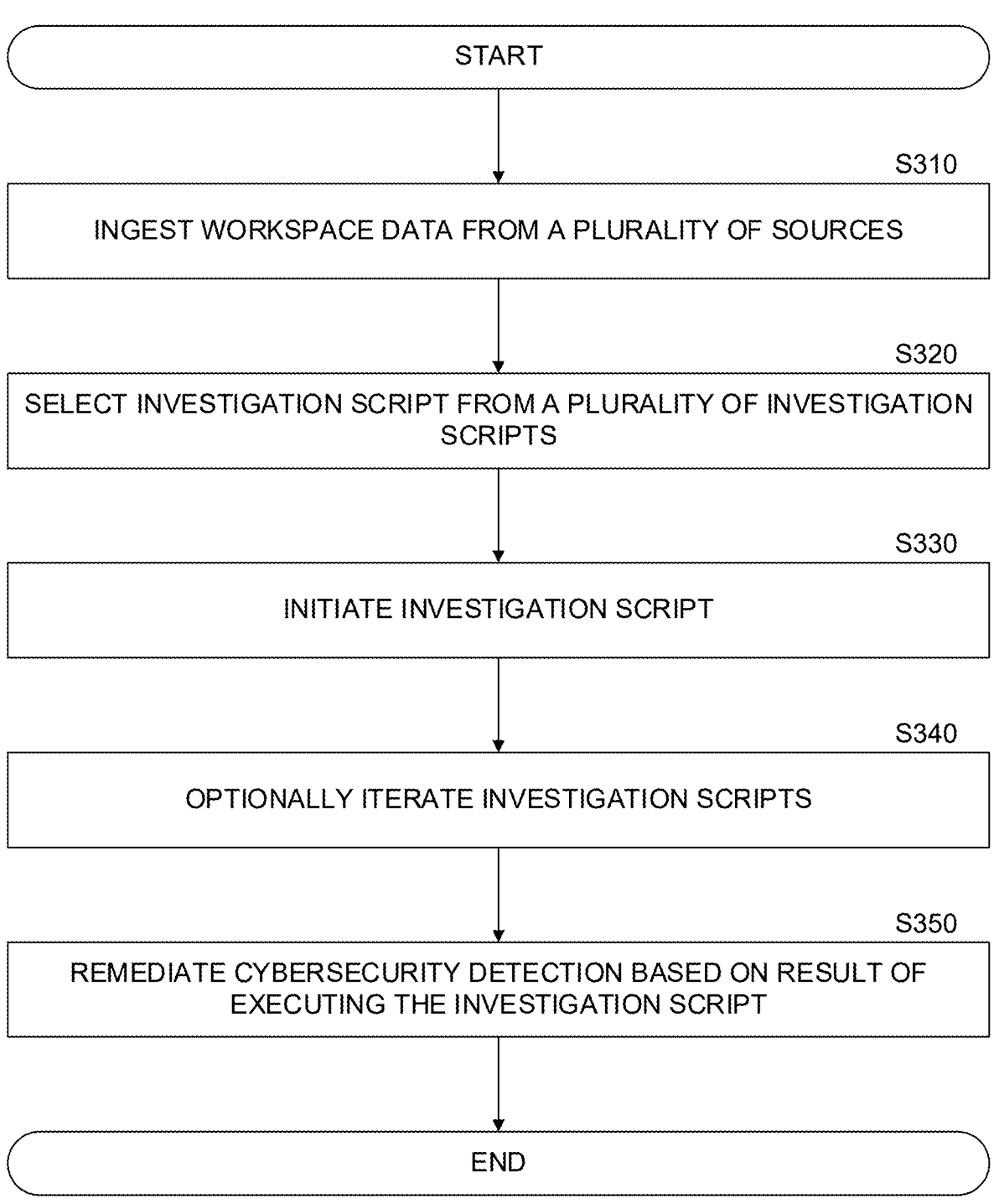
FIG. 3 is an example flowchart of a method for detecting a cybersecurity threat in a workspace platform, implemented in accordance with an embodiment.

FIG. 3 is an example flowchart of a method for detecting a cybersecurity threat in a workspace platform, implemented in accordance with an embodiment.

At S310, workspace data is ingested. In an embodiment, workspace data is ingested from a plurality of sources. Workspace data may be ingested continuously, periodically, via push, via pull, a combination thereof, and the like. In an embodiment, ingestion is configured for each source.

In some embodiments, a tenant engine includes an ingress layer including a push ingestor configured to receive HTTPS webhook events from a plurality of workspaces, e.g., chat/messaging systems such as Slack, Microsoft Teams, WhatsApp, videoconferencing systems such as Zoom, Google Meet, etc., and email services.

In an embodiment, the ingress layer includes a stream ingestor configured to maintain stateful subscriptions to continuous event streams from such workspaces. In some embodiments, the ingress layer includes a pull ingestor configured to periodically retrieve artifacts from sources lacking push capabilities.

In some embodiments, each ingestor is configured to normalize source-specific payloads into a standardized investigation schema associating tenant context with one or more indicators (e.g., URL, IP address, domain, email address, file), persist large artifacts to a payload repository with signed-URL references, and publish tenant-scoped trigger messages to a multi-tenant event bus on which provisional investigation records may be created.

In an embodiment, a scan orchestrator consumes the triggers, selects and prioritizes investigation scripts per indicator type based on runtime, cache TTL, chaining potential, cost, a combination thereof, and the like. In an embodiment, the scan orchestrator is configured to dispatch execution of scripts within the tenant's Kubernetes namespace. In an embodiment, results, interim statuses, and action requests (e.g., "click URL," "capture screenshot") of the investigation scripts feed persistence and external interfaces.

At S320, an investigation script is selected. In an embodiment, an investigation script is selected from a plurality of investigation scripts. In some embodiments, the plurality of investigation scripts includes an investigation script of a first type and an investigation script of a second type. In an embodiment, a first type consumes less computational resources (e.g., less processors, less memory, less networking resources, etc.), than a second type.

In some embodiments, responsive to receipt of a tenant-scoped trigger identifying one or more indicators, a scan orchestrator is configured to select an investigation script using a multi-stage process. In an embodiment, candidate scripts are obtained from a tenant-specific catalog and filtered based on indicator type compatibility, tenant enablement, dependency, egress permissions, health status, cache validity, a combination thereof, and the like. In certain embodiments, some scripts with unexpired time-to-live are excluded.

In an embodiment, script candidates are ranked using a scoring model that considers, without limitation, expected runtime, historical effectiveness for the tenant, freshness of prior results, likelihood of generating follow-on actions or additional indicators, service-level urgency, queue depth, cost budgets, a combination thereof, and the like.

In an embodiment, the tenant engine is configured to dispatch a first wave of scripts biased toward low-latency, high-signal scripts to facilitate early verdicts. In certain embodiments, executions (i.e., scripts which are executed) associated with a given indicator are grouped together and deduplicated. As results are received from executed investigations, scores are updated and additional waves of investigation scripts may be scheduled, including deeper analyses that invoke controlled actions (e.g., headless navigation or content rendering) subject to bounded generation limits.

In some embodiments, when a script yields a verdict exceeding a confidence threshold, an early-exit condition may terminate further scheduling for the affected indicator. Throughout execution, an execution-tracking component enforces per-script timeouts, retry policies, and resource limits, while policy controls permit analyst-defined weighting and sensitivity adjustments on a per-tenant basis.

At S330, an investigation script is initiated. In an embodiment, the tenant engine is configured to package an execution spec containing tenant context, indicator attributes, signed-URL references to any artifacts, policy flags, generation depth, resource/time limits, a combination thereof, and the like, and publishes the spec onto the tenant's work queue.

In an embodiment, a runner in the tenant's Kubernetes namespace consumes the spec, resolves secrets, performs egress allowlist checks, and launches the script as a container or WASM job. The execution tracker records start state and emits telemetry. For example, early-exit or error conditions are handled via status callbacks. In an embodiment, results stream back to the orchestrator and investigation results database, and follow-on scripts or actions are scheduled by the tenant engine as needed.

At optional S340, investigation scripts are reiterated. In an embodiment, reiteration occurs when new evidence, elapsed TTL, or analyst command requires additional execution. As partial results arrive, the tenant engine is configured to recompute scores. In some embodiments, where thresholds are unmet, the tenant engine is configured to schedule a subsequent wave for the same indicator or for new indicators spawned by actions.

In an embodiment, the tenant engine is configured to deduplicate and record prior runs, suppressing repeats until cache TTL expiry. Replays may run on historical investigations, with execution specs carrying greater generation depth or adjusted policy weights. In an embodiment, failures trigger bounded retries, while long-running jobs may be cancelled and resubmitted. In some embodiments, each iteration streams verdicts and artifacts back to persistence and can itself trigger further iterations until an early-exit or policy stop condition is satisfied.

At S350, a cybersecurity detection is remediated. In an embodiment, a policy layer of the tenant engine selects permissible remedies for the affected workspace and tenant, such as removing or annotating the original message, quarantining or replacing attachments, posting targeted user guidance, or suppressing the link by substituting a warning URL, various combinations thereof, and the like.

In an embodiment, where the source (i.e., workspace) supports controls, the tenant engine is configured to invoke workspace-native APIs to apply these changes. In certain embodiments, the tenant engine is configured to generate structured instructions to downstream SOAR, ticketing, and the like. In some embodiments, the indicator is recorded in the IOC store so future sightings are blocked or fast-tracked, and allow/deny lists are updated when the tenant uses them.

All actions are executed within the tenant's namespace with egress allowlists, are idempotent and auditable, and include rollback paths. In an embodiment, analysts can override, escalate, or widen blocks via an API without interrupting zero-touch defaults. In an embodiment, this can be provided as an input via a user interface generated by the tenant engine.

Figure 4:
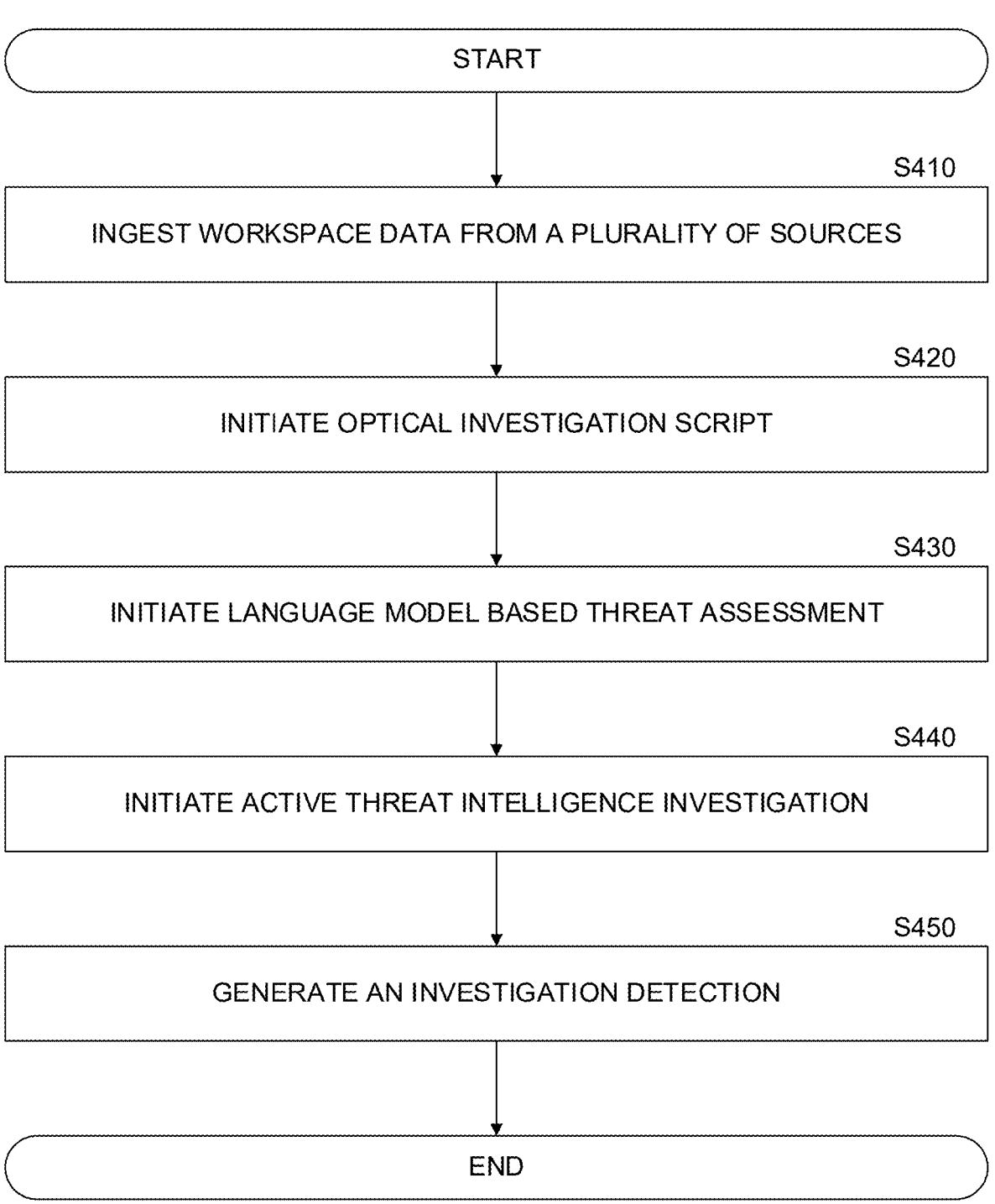
FIG. 4 is an example flowchart of a method for initiating a cybersecurity investigation module on an input from a workspace platform, implemented according to an embodiment.

FIG. 4 is an example flowchart of a method for initiating a cybersecurity investigation module on an input from a workspace platform, implemented according to an embodiment.

At S410, workspace data is ingested from a plurality of sources. Workspace data may be ingested continuously, periodically, via push, via pull, a combination thereof, and the like. In an embodiment, ingestion is configured for each source.

In some embodiments, a tenant engine includes an ingress layer including a push ingestor configured to receive HTTPS webhook events from a plurality of workspaces, e.g., chat/messaging systems such as Slack, Microsoft Teams, WhatsApp, videoconferencing systems such as Zoom, Google Meet, etc., and email services.

In an embodiment, the ingress layer includes a stream ingestor configured to maintain stateful subscriptions to continuous event streams from such workspaces. In some embodiments, the ingress layer includes a pull ingestor configured to periodically retrieve artifacts from sources lacking push capabilities.

In some embodiments, each ingestor is configured to normalize source-specific payloads into a standardized investigation schema associating tenant context with one or more indicators (e.g., URL, IP address, domain, email address, file), persist large artifacts to a payload repository with signed-URL references, and publish tenant-scoped trigger messages to a multi-tenant event bus on which provisional investigation records may be created.

In an embodiment, a scan orchestrator consumes the triggers, selects and prioritizes investigation scripts per indicator type based on runtime, cache TTL, chaining potential, cost, a combination thereof, and the like. In an embodiment, the scan orchestrator is configured to dispatch execution of scripts within the tenant's Kubernetes namespace. In an embodiment, results, interim statuses, and action requests (e.g., "click URL," "capture screenshot") of the investigation scripts feed persistence and external interfaces.

At S420, an optical investigation script is initiated. In some embodiments, an optical investigation script is a stateless analyzer configured to process visual evidence associated with an indicator, including URLs, images, PDFs, screenshots, a combination thereof, and the like.

In an embodiment, responsive to selection by the tenant engine, the script executes within the tenant's isolated runtime as a containerized or WASM job. In certain embodiments, inputs include indicator attributes and time-limited references to artifacts in a payload repository. In some embodiments, the script may request controlled actions that fetch HTML, render pages with headless browsers under specified device profiles, and capture screenshots at multiple viewports.

In certain embodiments, the script performs computer-vision and text-extraction operations, such as optical character recognition (OCR), logo and brand-mark detection (e.g., based on predefined templates), page-template and user-interface pattern recognition, perceptual hashing against reference assets, favicon and static-asset fingerprinting, QR code decoding, and visual anomaly analysis.

According to an embodiment, a script emits structured features, confidence values, and optional follow-on actions subject to bounded generation depth. In an embodiment, results and derived artifacts are persisted for auditing, while cache time-to-live prevents redundant executions. In some embodiments, execution is governed by per-script resource limits, egress allowlists, and centralized telemetry.

At S430, a language model based threat assessment is initiated. In an embodiment, a language model threat assessment is initiated when an investigation contains textual evidence. For example, in an embodiment a native message text from a workspace or text extracted by optical scripts from a rendered page, image, or PDF is used as an input for a language model.

According to an embodiment, the tenant engine is configured to detect a text indicator, filter the tenant's catalog for a language-model investigation script permitted by policy, verify cache TTLs to avoid reprocessing identical text, and open a check to group execution.

In an embodiment, the tenant engine is configured to assemble an execution spec with the normalized text, locale, nearby conversational context, tenant sensitivity settings, known entity hints from an identity graph, prior IOC matches, and resource limits. In an embodiment, the tenant engine launches the script inside the tenant's namespace using an approved LLM (e.g., self-hosted or brokered via an allowlisted API) after optional redaction and tokenization.

In an embodiment, the script applies a constrained prompt and threat taxonomy to classify social-engineering patterns, impersonation cues, financial-request intent, policy violations, and risk factors, emitting labels, confidence scores, extracted entities, rationales, and recommended follow-on actions. High-confidence findings can trigger early exit and remediation. In certain embodiments, the tenant engine is configured to schedule deeper URL or optical analyses.

At S440, an active threat intelligence investigation is initiated. In an embodiment, active threat intelligence investigation is initiated to gather corroborating evidence and new indicators. In an embodiment, active threat intelligence investigation is triggered by a confidence threshold, an analyst request, a playbook step, a combination thereof, and the like.

In an embodiment, the tenant engine is configured to authorize the action engine to take bounded actions such as DNS resolution, safe HTML fetches, guarded link following, limited crawling, headless rendering, submission of synthetic credentials to detect harvest flows, a combination thereof, and the like. In some embodiments, executions run in tenant-isolated sandboxes with egress allowlists, rate limits, and generation-depth caps.

In some embodiments, the tenant engine is configured to fingerprint infrastructure and content (e.g., WHOIS/TLS/ASN, hosting, redirects, beacon endpoints, script and asset signatures, page templates, logos, OCR text, QR codes), capture screenshots and artifacts, and identify reused kits or campaign markers.

In certain embodiments, newly discovered URLs, domains, IPs, files, and identities are added to the IOC store and correlated in the identity graph without leaking tenant context.

At S450, an investigation detected is generated. In some embodiments, a detection is generated when aggregated outputs from a plurality of investigation script executions associated with an indicator satisfy a tenant-configurable decision criterion. In an embodiment, responsive to a tenant-scoped trigger, a tenant engine is configured to select and launch one or more investigation scripts for the indicator.

In an embodiment, each execution emits features and a confidence value. According to an embodiment, a scoring component combines these outputs, accounting for script reputation, cache freshness, and policy weights, to produce an aggregate score. If any execution exceeds an early-exit threshold, a detection may be asserted without further scheduling.

In certain embodiments, the tenant engine is configured to authorize additional actions, including controlled retrieval, headless rendering, or bounded traversal, to refine confidence. Upon meeting the decision criterion, the system generates a detection object linked to the corresponding investigation and indicator, attaches evidentiary artifacts and explanatory rationales, assigns severity, and de-duplicates against recent matches and previously stored IOCs. In an embodiment, tenant engine is configured to emit a tenant-scoped notification via an external interface and may initiate remediation workflows in accordance with policy.

Figure 5:
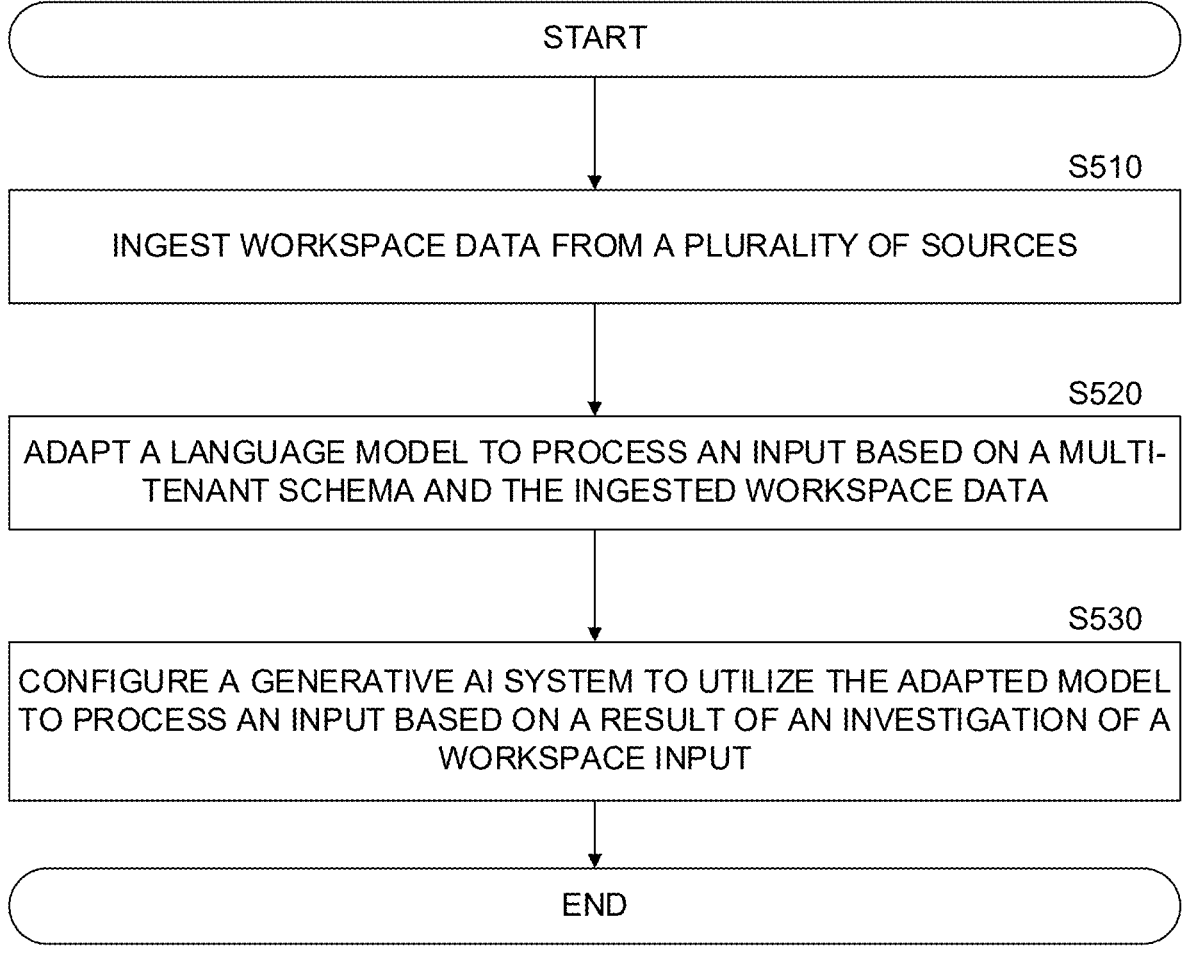
FIG. 5 is an example flowchart of a method for training an artificial intelligence (AI) model to detect a cybersecurity threat from a workspace platform, implemented in accordance with an embodiment.

FIG. 5 is an example flowchart of a method for training an artificial intelligence (AI) model to detect a cybersecurity threat from a workspace platform, implemented in accordance with an embodiment.

At S510, workspace data is ingested from a plurality of sources. Workspace data may be ingested continuously, periodically, via push, via pull, a combination thereof, and the like. In an embodiment, ingestion is configured for each source.

In some embodiments, a tenant engine includes an ingress layer including a push ingestor configured to receive HTTPS webhook events from a plurality of workspaces, e.g., chat/messaging systems such as Slack, Microsoft Teams, WhatsApp, videoconferencing systems such as Zoom, Google Meet, etc., and email services.

In an embodiment, the ingress layer includes a stream ingestor configured to maintain stateful subscriptions to continuous event streams from such workspaces. In some embodiments, the ingress layer includes a pull ingestor configured to periodically retrieve artifacts from sources lacking push capabilities.

In some embodiments, each ingestor is configured to normalize source-specific payloads into a standardized investigation schema associating tenant context with one or more indicators (e.g., URL, IP address, domain, email address, file), persist large artifacts to a payload repository with signed-URL references, and publish tenant-scoped trigger messages to a multi-tenant event bus on which provisional investigation records may be created.

In an embodiment, a scan orchestrator consumes the triggers, selects and prioritizes investigation scripts per indicator type based on runtime, cache TTL, chaining potential, cost, a combination thereof, and the like. In an embodiment, the scan orchestrator is configured to dispatch execution of scripts within the tenant's Kubernetes namespace. In an embodiment, results, interim statuses, and action requests (e.g., "click URL," "capture screenshot") of the investigation scripts feed persistence and external interfaces.

At S520, a language model is adapted to process an input. In some embodiments, a language model is adapted by constructing a tenant-scoped inference payload from the platform's multi-tenant investigation schema and the ingested workspace data. In an embodiment, the payload includes normalized textual evidence associated with one or more indicators, tenant identifiers, platform metadata, locale, and optional side signals such as prior IOC matches, identity-graph hints, and outputs from other investigation scripts (for example, OCR text and brand features).

At S530, a generative AI system is configured to process the input. In an embodiment, the generative AI system includes a large language model (LLM). In some embodiments, the LLM is configured to process a prompt including the input.

In some embodiments, the generative AI system is configured to process an input including a prompt which is adapted based on outputs of an investigation script, and a context. In an embodiment, the context is tenant-specific, including tenant data, a schema of the tenant, a schema of the workspace (i.e., source), a combination thereof, and the like.

FIG. 6 is an example investigation output of a cybersecurity module script, utilized to describe an embodiment. In an embodiment, the module script 600 includes a result message emitted after an investigation script runs on a specific indicator. In an embodiment, a script identifier indicates which script produced the output (plugin_id) and which indicator was analyzed (indicator_id). The script's current verdict is "suspicious" with 0.82 confidence, meaning the finding is notable but may need additional evidence.

It recommends follow-on analysis via next_plugins, here suggesting an OCR-focused investigation. During execution it also created new evidence: a screenshot captured by an action step. That artifact is not embedded; it is referenced as a new indicator of type img/screenshot whose value is a repository URL, typically a time-limited link. The orchestrator will persist this result, update the investigation's aggregate score, enqueue the recommended next plugin, and open a new check for the screenshot so downstream scripts can analyze it.

Figure 7:
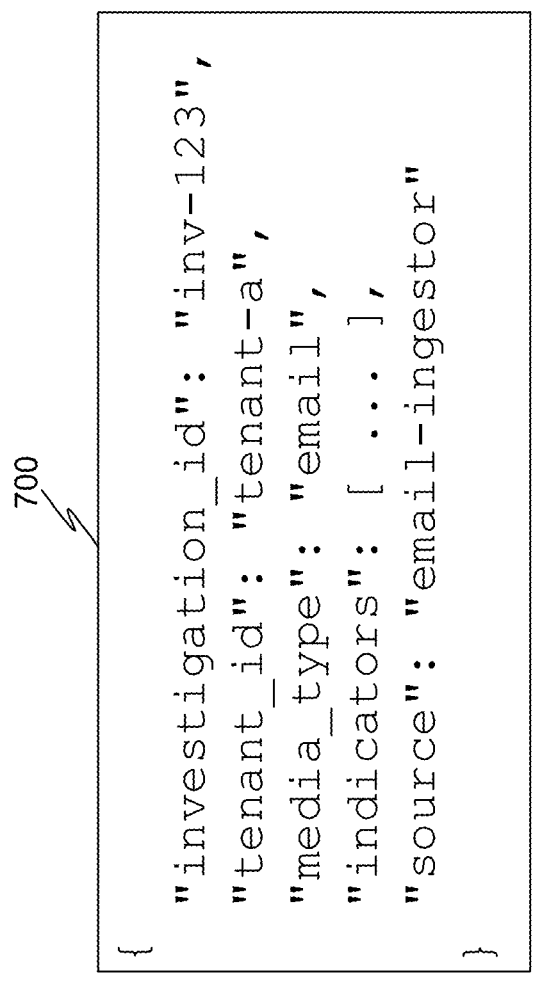
FIG. 7 is an example cybersecurity module script, utilized to describe an embodiment.

FIG. 7 is an example cybersecurity module script, utilized to describe an embodiment. In an embodiment, the output is in a JSON format. In some embodiments, the JSON is a normalized envelope for a new investigation created by the email ingestor. The module includes investigation\_id which uniquely identifies the investigation so all checks, script runs, and artifacts can attach to the same case. The module 700 further includes tenant\_id which specifies which customer namespace the data belongs to, enforcing isolation and tenant-specific policy.

The module further includes media\_type which tells downstream components the workspace modality, i.e., email, so orchestration can pick appropriate investigation scripts and actions. In an embodiment, indicators is the list derived from the ingested email (not shown), including items such as URLs, domains, sender addresses, file attachments/hashes, and header-derived signals. In some embodiments, source records indicate which ingress component produced the envelope; email-ingestor indicates routing, audit, and debugging.

After emission, this object is published to the tenant's trigger topic, a provisional investigation may be persisted, and the tenant engine begins selecting scripts for the included indicators.

FIG. 8 is an example code object indicating a weight function for a cybersecurity module of a plurality of cybersecurity modules, utilized to describe an embodiment. In an embodiment, the weight function 800 includes a base_priority which is a static, per-script utility signal (e.g., historically valuable for this tenant). The weight function 800 includes a runtime weight which reflects expected latency/cost normalized so faster/cheaper yields a higher subscore.

A confidence weight is utilized to estimate detection quality from prior outcomes on similar indicators, and a chained weight indicates the script's likelihood to produce useful follow-on action or new indicator.

Figure 9:
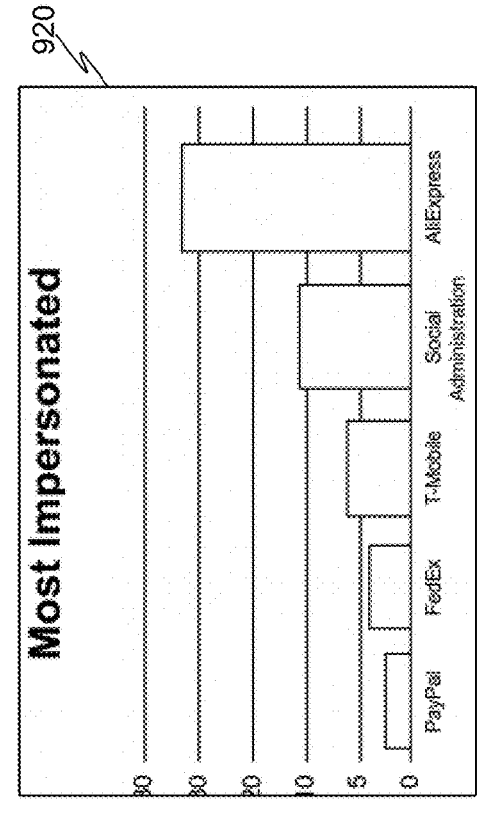
FIG. 9 is an example graphical user interface displaying outputs of various cybersecurity threat detection modules, implemented in accordance with an embodiment.
Figure 9:
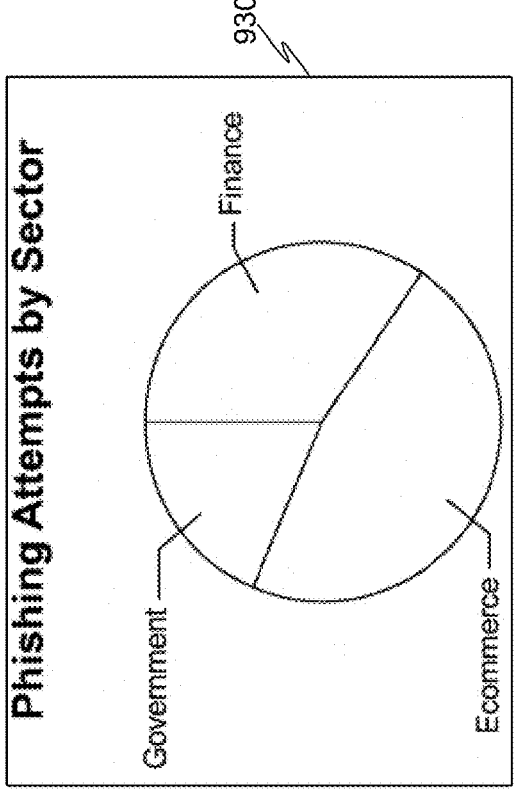
Figure 9:
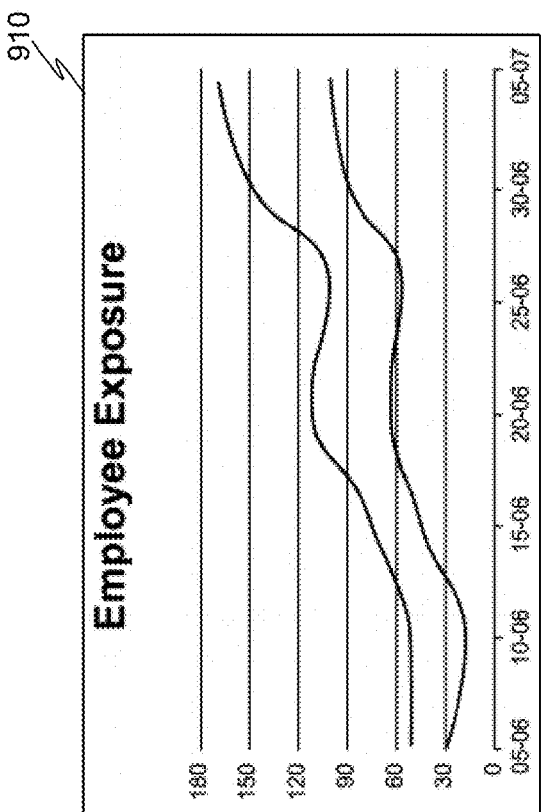
Figure 9:
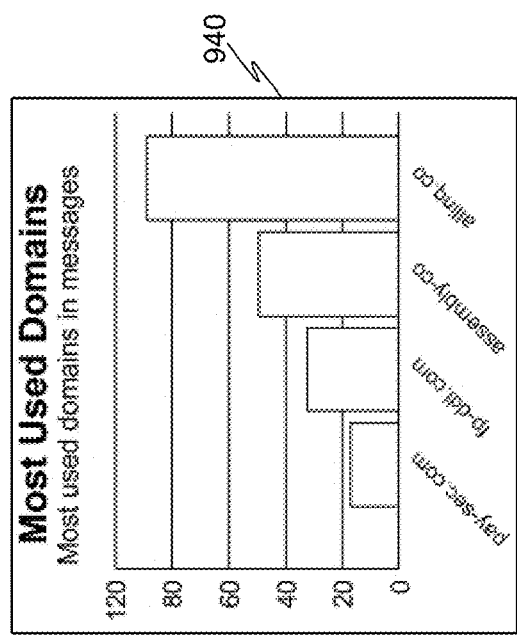

FIG. 9 is an example graphical user interface displaying outputs of various cybersecurity threat detection modules, implemented in accordance with an embodiment. In an embodiment, a GUI includes a plurality of widgets. For example, in an embodiment, a first chart 910 indicates employee exposure over time. In some embodiments, a second chart 920 indicates which entities are most impersonated.

In certain embodiments, a bar chart 940 indicates which domains are most used in messages, attacks, etc. Further, a pie chart 930 indicates which sectors in an organization are targeted for a specific type of cybersecurity attack known as a phishing attempt.

Figure 10:
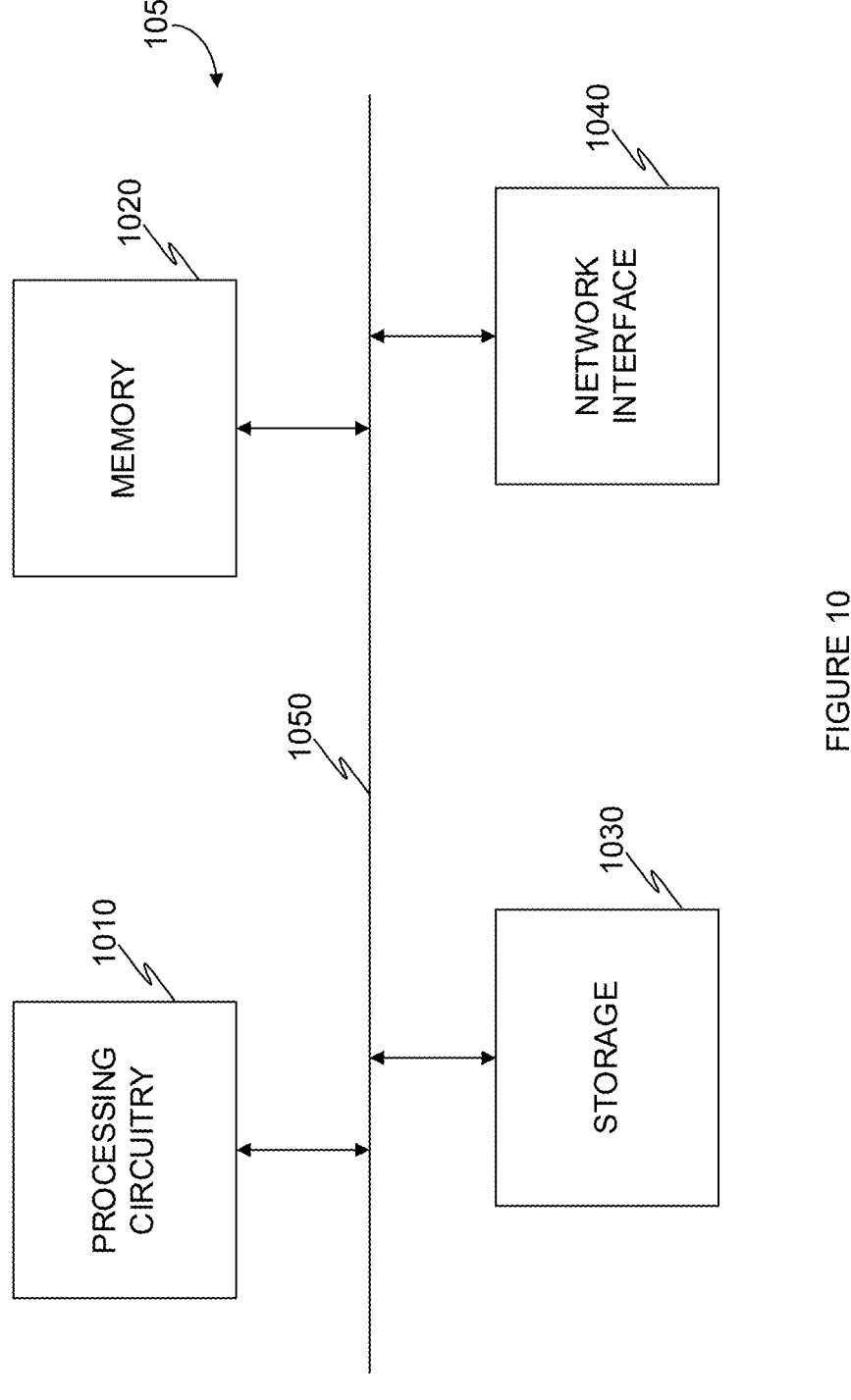
FIG. 10 is an example schematic diagram of a multi-tenant workspace protection system according to an embodiment.

FIG. 10 is an example schematic diagram of a multi-tenant workspace protection system 105 according to an embodiment. The multi-tenant workspace protection system 105 includes, according to an embodiment, a processing circuitry 1010 coupled to a memory 1020, a storage 1030, and a network interface 1040. In an embodiment, the components of the multi-tenant workspace protection system 105 are communicatively connected via a bus 1050.

In certain embodiments, the processing circuitry 1010 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 1020 is a volatile memory (e.g., random access memory, etc.), a non-volatile memory (e.g., read only memory, flash memory, etc.), a combination thereof, and the like. In some embodiments, the memory 1020 is an on-chip memory, an off-chip memory, a combination thereof, and the like. In certain embodiments, the memory 1020 is a scratch-pad memory for the processing circuitry 1010.

In one configuration, software for implementing one or more embodiments disclosed herein is stored in the storage 1030, in the memory 1020, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 1010, cause the processing circuitry 1010 to perform the various processes described herein, in accordance with an embodiment.

In some embodiments, the storage 1030 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 1040 is configured to provide the multi-tenant workspace protection system 105 with communication with, for example, the communication platform 110, the conference platform 120, the SaaS platform 130, various combinations thereof, and the like, according to an embodiment.

It should be understood that the embodiments described herein are not limited to the specific architecture illustrated in FIG. 10, and other architectures may be equally used without departing from the scope of the disclosed embodiments.

Furthermore, in certain embodiments the tenant engine 140, the centralized IOC database 150, the optical recognition unit 160, the data analysis unit 170, the mitigation service 180, and a combination thereof, may be implemented with the architecture illustrated in FIG. 10. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting a cybersecurity attack in a workspace platform, comprising:
    ingesting workspace data from a cloud-based workspace provider;
    selecting a first-tier investigation script from a plurality of investigation scripts, the plurality of investigation scripts including the first-tier investigation script and a second-tier investigation script;
    executing the first-tier investigation script on the ingested workspace data;
    detecting a potential cybersecurity attack based on a result of executing the first-tier investigation script; and
    executing the second-tier investigation script in response to detecting the potential cybersecurity attack.

2. The method of claim 1, further comprising:
    determining that the potential cybersecurity attack is an actual cybersecurity attack based on a result of executing the second-tier investigation script; and
    initiating a remediation action based on the actual cybersecurity attack.

3. The method of claim 1, further comprising:
    ingesting multi-tenant workspace data from the cloud-based workspace provider; and
    executing the first-tier investigation script only on ingested data of a first tenant.

4. The method of claim 1, further comprising:
    executing a plurality of first-tier investigation scripts prior to executing the second-tier investigation script, wherein each first-tier investigation script utilizes less compute resources than the second-tier investigation script.

5. The method of claim 1, further comprising:
    detecting the potential cybersecurity attack further based on an indicator of compromise (IOC) database, wherein the IOC database is generated based on multi-tenant data.

6. The method of claim 5, further comprising:
    generating a detection based on any one of: the result of executing the first-tier investigation script, a result of executing the second-tier investigation script, and any combination thereof.

7. The method of claim 6, further comprising:
    generating the detection further based on an entry in the IOC database.

8. The method of claim 7, further comprising:
    initiating a remediation action in a cloud computing environment utilizing the cloud-based workspace provider, the remediation action based on the entry in the IOC database.

9. The method of claim 1, further comprising:
    executing any one of a plurality of investigation scripts, including: an optical recognition script, a data analysis script, a mitigation script, and any combination thereof.

10. A non-transitory computer-readable medium storing a set of instructions for detecting a cybersecurity attack in a workspace platform, the set of instructions comprising:
    one or more instructions that, when executed by one or more processing circuitry of a device, cause the device to:
        ingest workspace data from a cloud-based workspace provider;
        select a first-tier investigation script from a plurality of investigation scripts, the plurality of investigation scripts including the first-tier investigation script and a second-tier investigation script;
        execute the first-tier investigation script on the ingested workspace data;
        detect a potential cybersecurity attack based on a result of executing the first-tier investigation script; and
        execute the second-tier investigation script in response to detecting the potential cybersecurity attack.

11. A system for detecting a cybersecurity attack in a workspace platform comprising:
    a processing circuitry;
    a memory, the memory containing instructions that, when executed by the processing circuitry, configure the system to:
    ingest workspace data from a cloud-based workspace provider;
    select a first-tier investigation script from a plurality of investigation scripts, the plurality of investigation scripts including the first-tier investigation script and a second-tier investigation script;
    execute the first-tier investigation script on the ingested workspace data;
    detect a potential cybersecurity attack based on a result of executing the first-tier investigation script; and
    execute the second-tier investigation script in response to detecting the potential cybersecurity attack.

12. The system of claim 11, wherein the memory contains further instructions which when executed by the processing circuitry further configure the system to:

determine that the potential cybersecurity attack is an actual cybersecurity attack based on a result of executing the second-tier investigation script; and initiate a remediation action based on the actual cybersecurity attack.

13. The system of claim 11, wherein the memory contains further instructions which when executed by the processing circuitry further configure the system to:

ingest multi-tenant workspace data from the cloud-based workspace provider; and execute the first-tier investigation script only on ingested data of a first tenant.

14. The system of claim 11, wherein the memory contains further instructions which when executed by the processing circuitry further configure the system to:

execute a plurality of first-tier investigation scripts prior to executing the second-tier investigation script, wherein each first-tier investigation script utilizes less compute resources than the second-tier investigation script.

15. The system of claim 11, wherein the memory contains further instructions which when executed by the processing circuitry further configure the system to:

detect the potential cybersecurity attack further based on an indicator of compromise (IOC) database, wherein the IOC database is generated based on multi-tenant data.

16. The system of claim 15, wherein the memory contains further instructions which when executed by the processing circuitry further configure the system to:

generate a detection based on any one of: the result of execute the first-tier investigation script, a result of executing the second-tier investigation script, and any combination thereof.

17. The system of claim 16, wherein the memory contains further instructions which when executed by the processing circuitry further configure the system to:

generate the detection further based on an entry in the IOC database.

18. The system of claim 17, wherein the memory contains further instructions which when executed by the processing circuitry further configure the system to:

initiate a remediation action in a cloud computing environment utilizing the cloud-based workspace provider, the remediation action based on the entry in the IOC database.

19. The system of claim 11, wherein the memory contains further instructions which when executed by the processing circuitry further configure the system to:

execute any one of a plurality of investigation scripts, including: an optical recognition script, a data analysis script, a mitigation script, and any combination thereof.

* * * * *